United States Patent
Choi

(10) Patent No.: US 10,301,985 B2
(45) Date of Patent: May 28, 2019

(54) LUBRICATING APPARATUS FOR TURBO COMPOUND SYSTEM

(71) Applicant: Hyundai Motor Company, Seoul (KR)

(72) Inventor: Dong Hyuk Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 347 days.

(21) Appl. No.: 15/374,713

(22) Filed: Dec. 9, 2016

(65) Prior Publication Data
US 2018/0058279 A1 Mar. 1, 2018

(30) Foreign Application Priority Data

Aug. 25, 2016 (KR) .................. 10-2016-0108049

(51) Int. Cl.
*F01M 11/02* (2006.01)
*F01D 5/02* (2006.01)
(Continued)

(52) U.S. Cl.
CPC .............. *F01M 11/02* (2013.01); *F01D 5/02* (2013.01); *F01D 15/12* (2013.01); *F01D 25/16* (2013.01); *F01D 25/18* (2013.01); *F02B 41/10* (2013.01); *F02F 7/0043* (2013.01); *F16H 57/042* (2013.01); *F16H 57/0447* (2013.01); *F01M 2011/021* (2013.01); *F01M 2011/022* (2013.01);
(Continued)

(58) Field of Classification Search
CPC ............ F01M 11/02; F01M 2011/021; F01M 2011/022; F01D 5/02; F01D 15/12; F01D 25/16; F01D 25/18; F02B 41/10; F02F 7/0043; F16H 57/042; F16H 57/0447; F05D 2220/40; Y02T 10/163
See application file for complete search history.

(56) References Cited

U.S. PATENT DOCUMENTS 4,676,667 A * 6/1987 Komatsu ................. F01D 25/16
                                                    384/517
4,969,332 A * 11/1990 Nancarrow ............. F01D 15/08
                                                    60/608
(Continued)

FOREIGN PATENT DOCUMENTS

JP          S61-502692 A    11/1986
JP          S62-031632 Y2    8/1987
(Continued)

*Primary Examiner* — Michael A Riegelman
(74) *Attorney, Agent, or Firm* — Morgan, Lewis & Bockius LLP

(57) ABSTRACT

Disclosed is a lubricating apparatus including an oil supply pipe connected to a gearbox of a gearing device for transmitting turning force of a blowdown turbine in the turbo compound system to a crankshaft to supply oil into the gearbox, a first oil supply opening formed to be transpierced at the bearing housing of a first bearing rotatably supporting a shaft of an output gear for outputting turning force in the turbo compound system to supply oil supplied from the gearbox to the first bearing, a sub-supply pipe connected to a gear case in which the output gear is embedded to supply oil to the gear case, and a second oil supply opening formed to be transpierced at the bearing housing of a second bearing rotatably supporting the shaft of the output gear to supply oil supplied through the sub-supply pipe to the second bearing.

6 Claims, 7 Drawing Sheets

(51) Int. Cl.
    *F01D 15/12*     (2006.01)
    *F02F 7/00*     (2006.01)
    *F16H 57/04*     (2010.01)
    *F02B 41/10*     (2006.01)
    *F01D 25/16*     (2006.01)
    *F01D 25/18*     (2006.01)

(52) U.S. Cl.
    CPC .......... *F05D 2220/40* (2013.01); *Y02T 10/163* (2013.01)

(56) References Cited

U.S. PATENT DOCUMENTS

| | | | | |
|---|---|---|---|---|
| 5,253,985 | A * | 10/1993 | Ruetz | F01D 25/164 384/473 |
| 6,877,901 | B2 * | 4/2005 | Wollenweber | F01D 25/164 384/535 |
| 6,895,753 | B2 * | 5/2005 | Larsson | F01D 11/06 60/624 |
| 9,062,595 | B2 * | 6/2015 | Jones | F02B 39/14 |
| 2007/0183704 | A1 * | 8/2007 | Umekawa | F01D 25/16 384/517 |
| 2010/0175377 | A1 * | 7/2010 | Hippen | F02B 37/10 60/602 |
| 2011/0048000 | A1 * | 3/2011 | Kley | F01D 25/16 60/598 |
| 2012/0023939 | A1 * | 2/2012 | Kley | F02B 39/04 60/624 |
| 2012/0051906 | A1 * | 3/2012 | House | F01D 25/16 415/229 |
| 2013/0259416 | A1 * | 10/2013 | Schmidt | F16C 19/184 384/490 |
| 2014/0086731 | A1 * | 3/2014 | Schmidt | F01D 25/125 415/170.1 |
| 2014/0369865 | A1 * | 12/2014 | Marsal | F01D 25/16 417/406 |
| 2016/0252134 | A1 * | 9/2016 | Koda | F01D 25/16 384/462 |
| 2018/0003223 | A1 * | 1/2018 | Schmidt | F16C 35/067 |
| 2018/0023620 | A1 * | 1/2018 | Berger | F16C 17/10 384/107 |
| 2018/0058279 | A1 * | 3/2018 | Choi | F01D 25/16 |
| 2018/0058311 | A1 * | 3/2018 | Choi | F02B 37/00 |

FOREIGN PATENT DOCUMENTS

| | | |
|---|---|---|
| JP | H06-058158 A | 3/1994 |
| JP | 2004-530834 | 10/2004 |
| JP | 2005-263990 | 9/2005 |
| JP | 2011-052690 | 3/2011 |
| JP | 2012-533703 | 12/2012 |
| JP | 2013-503283 A | 1/2013 |

\* cited by examiner

LUBRICATING APPARATUS FOR TURBO COMPOUND SYSTEM

CROSS-REFERENCE TO RELATED APPLICATION

The present application claims priority to Korean Patent Application No. 10-2016-0108049, filed on Aug. 25, 2016 in the Korean Intellectual Property Office, the entire contents of which is incorporated herein for all purposes by this reference.

BACKGROUND OF THE INVENTION

Field of the Invention

The present invention relates to a lubricating apparatus for a turbo compound system, and more particularly, to a lubrication apparatus for a turbo compound improving an oil supply system of bearings to solve degradation of lubrication due to lack of oil supply.

Description of Related Art

Research on a turbo compound system collecting waste energy thrown away from vehicles such as exhaust gas discharged upon operation of an engine to regenerate electrical energy or mechanical energy is continuously carried out.

The turbo compound system is a system for collecting kinetic energy of exhaust gas discharged from the engine of the vehicle. A blowdown turbine may be additionally mounted to collect kinetic energy of exhaust gas besides a turbocharger turbine used for suction supercharge. Energy collected at the blowdown turbine may be electrically or mechanically applied to available places in the vehicle.

Hereinafter, a configuration of the turbo compound system and a method of operating the same will be described in detail.

FIG. 1 is a view schematically illustrating a configuration of a turbo compound system.

In FIG. 1, reference numeral 11 denotes a turbocharger turbine converting energy of exhaust gas of an engine 10 into mechanical work. The turbocharger turbine 11 is connected to a compressor 12 via a coaxial shaft.

In addition, a blowdown turbine 13 is disposed at an exhaust outlet of the turbocharger turbine 11 side.

Herein, the blowdown turbine 13 is connected to a crankshaft 21 of the engine 10 through a driveline to transmit power. The driveline includes a gearing unit 15 having deceleration function. The blowdown turbine 13 is connected to the crankshaft 21 of the engine 10 through the gearing unit 15 to transmit power.

In detail, a first reduction gear 16 is mounted at a turbine shaft 14 of the blowdown turbine 13. The first reduction gear 16 is engaged with a second reduction gear 17 and the second reduction gear 17 is connected to an output gear 19 via a shaft 18.

Furthermore, the output gear 19 is engaged with a crankshaft gear 22 mounted at the crankshaft 21.

Accordingly, when the engine 10 is driven, exhaust gas discharged from the engine 10 rotates the turbocharger turbine 11 while the compressor 12 connected to the turbocharger turbine 11 via the coaxial shaft is rotated. At this time, the compressor 12 as a sucker for burning of fuel compresses ambient air in order to supercharge the compressed air to the engine 10.

At the same time, exhaust gas driving the turbocharger turbine 11 is discharged to the blowdown turbine 13 to rotate the blowdown turbine 13.

Herein, turning force of the blowdown turbine 13 is transmitted to the crankshaft 21 of the engine 10 through the gearing unit 15 and the crankshaft gear 22, thereby increasing output of the engine 10 without additional fuel consumption.

Meanwhile, a lubricating method of the turbo compound system will be described. In the case of the first reduction gear 16 and the second reduction gear 17 of the gearing unit 15, lubrication is performed by engine oil supplied from a cylinder block of the engine 10.

Alternatively, in the case of the output gear 19, lubrication of the output gear 19 is performed by collecting oil which is scattered after lubrication of the reduction gears 16 and 17 is performed.

However, in the lubricating structure of the conventional turbo compound system, when a mounting position of the output gear 19 is changed according to an engine layout or when the shaft 18 of the output gear 19 is elongated, oil supply to the bearings is insufficient, thereby hindering proper lubrication.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lubricating apparatus for a turbo compound system improving an oil supply system of bearings to solve degradation of lubrication due to lack of oil supply.

In accordance with one aspect of the present invention, the above and other objects can be accomplished by the provision of a lubricating apparatus of a turbo compound system including an oil supply pipe connected to a gearbox of a gearing device for transmitting turning force of a blowdown turbine in the turbo compound system to a crankshaft to supply oil into the gearbox, a first oil supply hole formed to be transpierced at the bearing housing of a first bearing rotatably supporting a shaft of an output gear for outputting turning force in the turbo compound system to supply oil supplied inside the gearbox to the first bearing, a sub-supply pipe connected to a gear case in which the output gear is embedded to supply oil to the gear case, and a second oil supply hole formed to be transpierced at the bearing housing of a second bearing rotatably supporting the shaft of the output gear to supply oil supplied through the sub-supply pipe to the second bearing.

In an exemplary embodiment, the oil supply pipe may be connected from a cylinder block of the engine to the gearbox in which reduction gears of the gearing device are embedded to supply oil from the engine.

In another exemplary embodiment, the sub-supply pipe may be diverged from the oil supply pipe to supply oil from the oil supply pipe and is connected to the gear case.

In still another exemplary embodiment, the sub-supply pipe may supply oil from the engine to the gear case.

In yet another exemplary embodiment, the sub-supply pipe may be mounted with a supply control valve for selectively controlling supply or block of oil.

In still yet another exemplary embodiment, an oil passage hole may be formed to be transpierced at the gear case to supply oil supplied through the sub-supply pipe to the second oil supply hole through the oil passage hole.

Other aspects and exemplary embodiments of the invention are discussed infra.

It is understood that the terms "vehicle", "vehicular" and other similar terms as used herein are inclusive of motor vehicles in general including passenger automobiles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
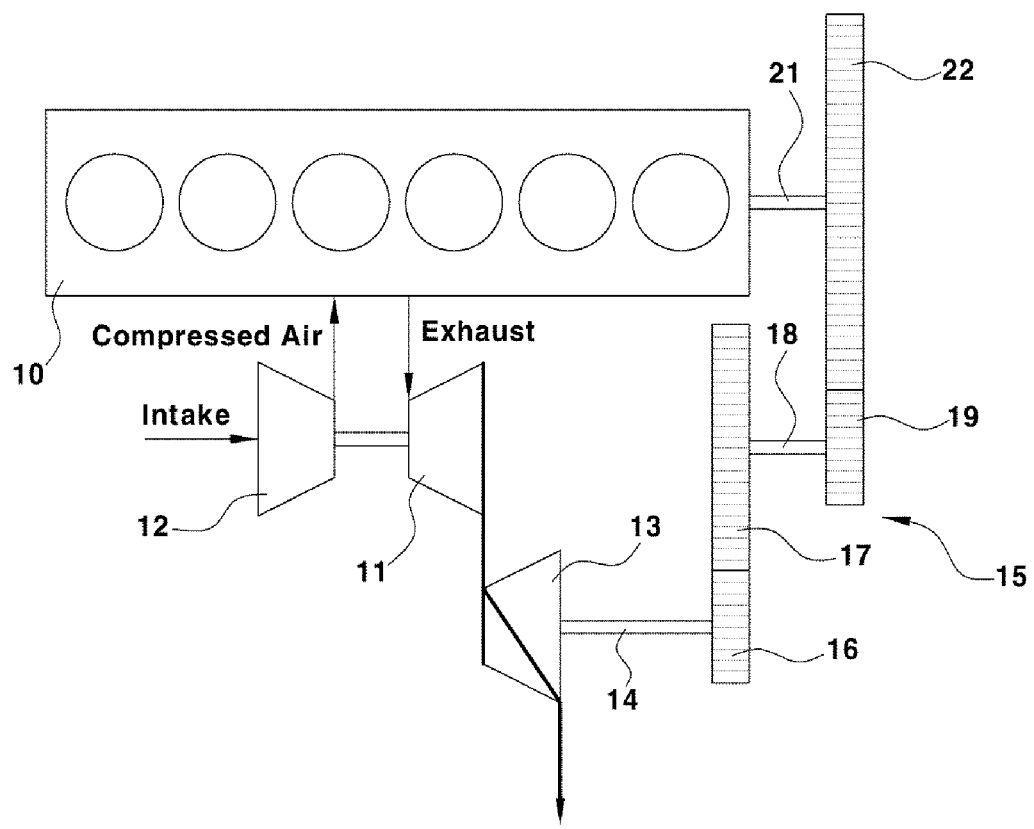
FIG. 1 is a view schematically illustrating a configuration of a turbo compound system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Unless explicitly stated to the contrary, the word "comprise," "comprises" or "comprising" used throughout the specification will not be understood as the exclusion of the other elements but to imply the inclusion of the other elements.

Hereinafter, the publicly known lubricating structure for the output gear will be described for better understanding the present invention.

Figure 2:
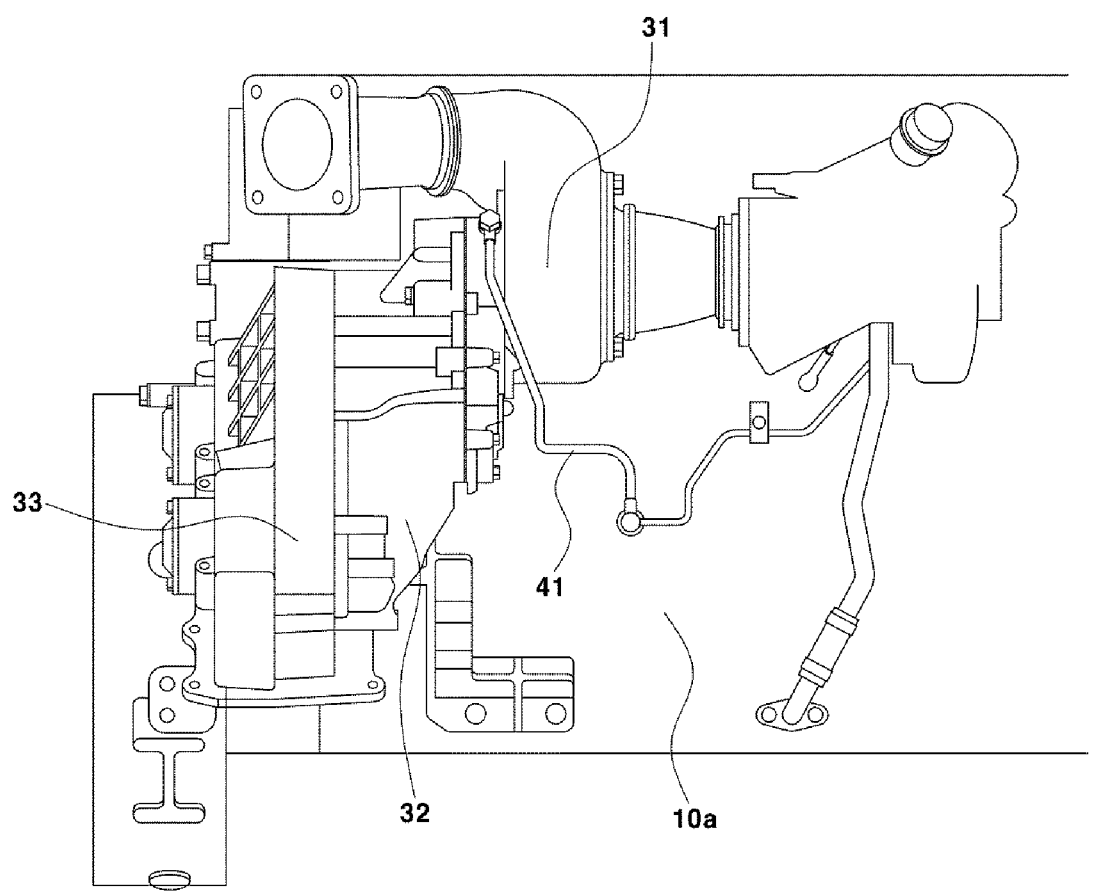
FIG. 2 is a view illustrating a mounted state of a turbo compound system.
Figure 3:
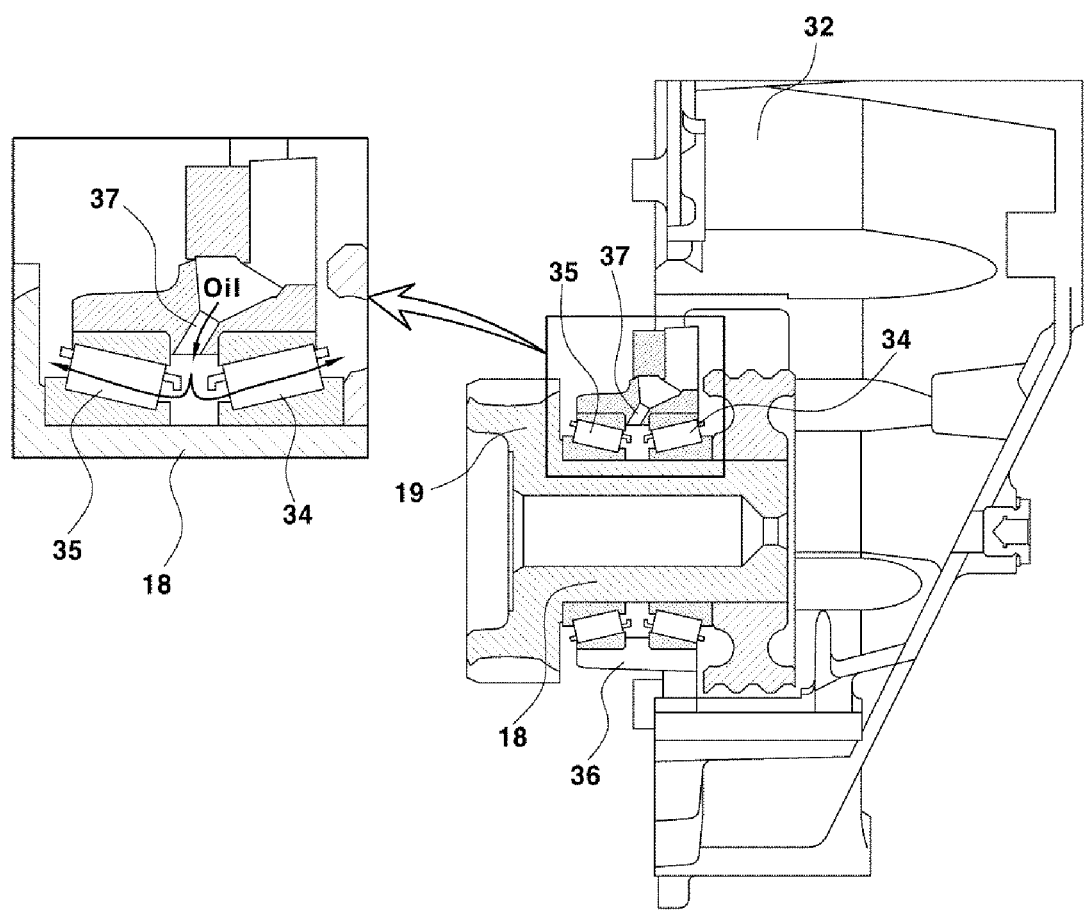
FIG. 3 is a view illustrating a mounted state of an output gear of the turbo compound system.

FIG. 2 is a view illustrating a mounted state of a turbo compound system. FIG. 3 is a view illustrating a mounted state of an output gear of the turbo compound system.

Referring to FIG. 2, a turbine housing 31 in which a blowdown turbine 13 of the turbo compound system is embedded is connected to a gearbox 32. The gearbox 32 and a gear case 33 are assembled integrally.

Reduction gears 16 and 17 and an output gear 19 which reduce turning force of the blowdown turbine 13 to transmit and output the turning force are embedded in the gearbox 32 and the gear case 33.

That is, a first reduction gear 16 and a second reduction gear 17 for reducing turning force of the blowdown turbine 13 are embedded in the gearbox 32. The output gear 19 finally outputting turning force reduced at the turbo compound system is embedded in the gear case 33.

Herein, a shaft of each gear is rotatably supported by bearings in the gearbox 32 and the gear case 33. In the case of the reduction gears 16 and 17, lubrication of bearings of the reduction gears 16 and 17 is performed by oil directly supplied through an oil supply pipe 41 from a cylinder block 10a of an engine 10.

Furthermore, in the case of the output gear 19, after lubricating the reduction gears 16 and 17 in the gearbox 32, scattered oil is collected and the collected oil is used to lubricate bearings 34 and 35 of the output gear 19.

The oil supply pipe 41 is mounted to be connected between the cylinder block 10a and the gearbox 32 to supply oil for lubrication from the cylinder block 10a to the reduction gears 16 and 17 in the gearbox 32 of the turbo compound system.

Referring to FIG. 3, a shaft 18 of the output gear 19 of the turbo compound system is rotatably supported by two tapered bearings 34 and 35 at both sides of the shaft 18 in the gear case 33. Hereinafter, the two bearings 34 and 35 are referred to as a first bearing and a second bearing, respectively.

The first bearing 34 and the second bearing 35 have an integrated bearing housing 36. An oil supply hole 37 is formed at the bearing housing 36 to supply oil collected after being scattered in the gearbox 32 to each of the bearings 34 and 35.

Accordingly, after lubricating the reduction gears 16 and 17 in the gearbox 32, oil is scattered by the reduction gears 16 and 17 and then is collected. The collected oil is supplied through the oil supply hole 37 of the bearing housing 36 in the gear case 33. The oil supplied through the oil supply hole 37 is distributed to the first bearing 34 and the second bearing 35.

In the lubricating structure of the turbo compound system, when a mounting position of the output gear 19 is changed according to an engine layout or when a length of a shaft 18 of the output gear 19 is increased, oil supply to the bearings, oil supply to the second bearing 35, is insufficient, hindering proper lubrication of the second bearing 35.

To this end, an improved lubricating structure will be described.

Figure 4:
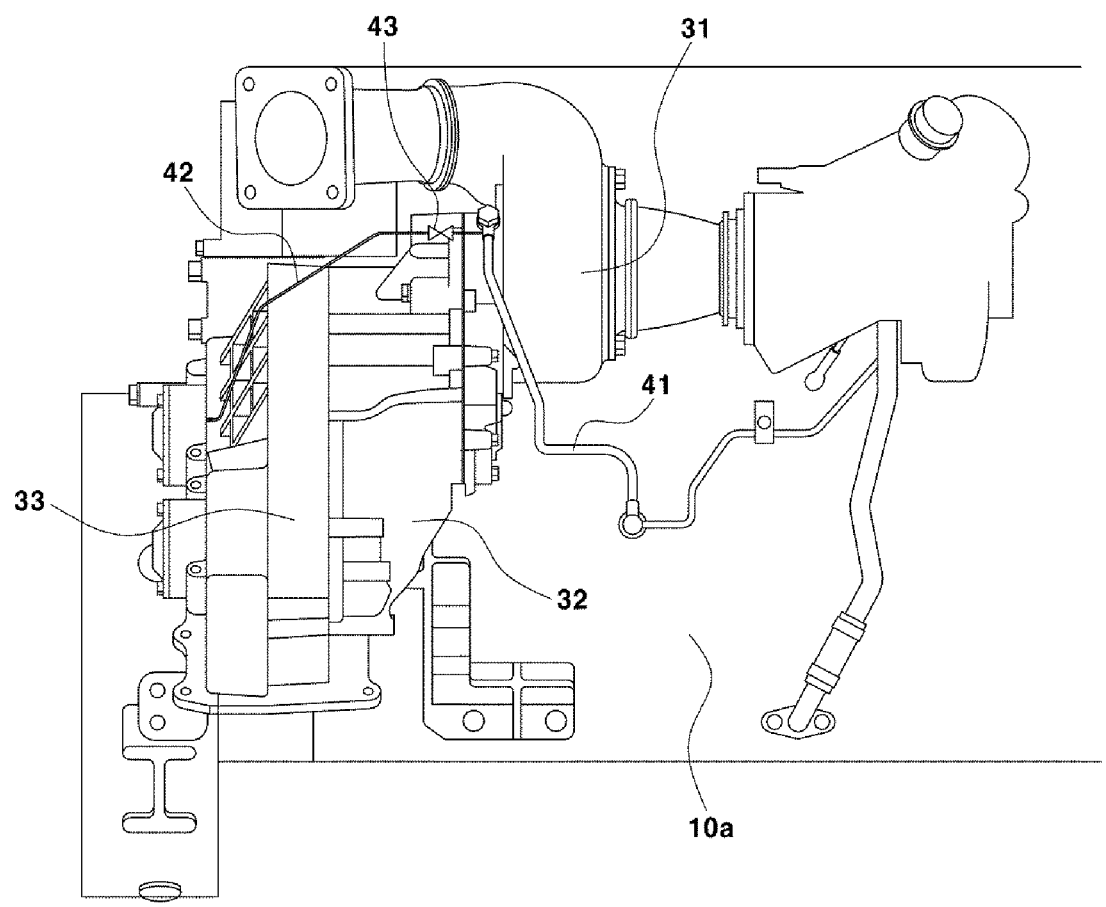
FIG. 4 is a view illustrating a mounted state of a turbo compound system with a lubricating system according to an exemplary embodiment of the present invention.
Figure 5:
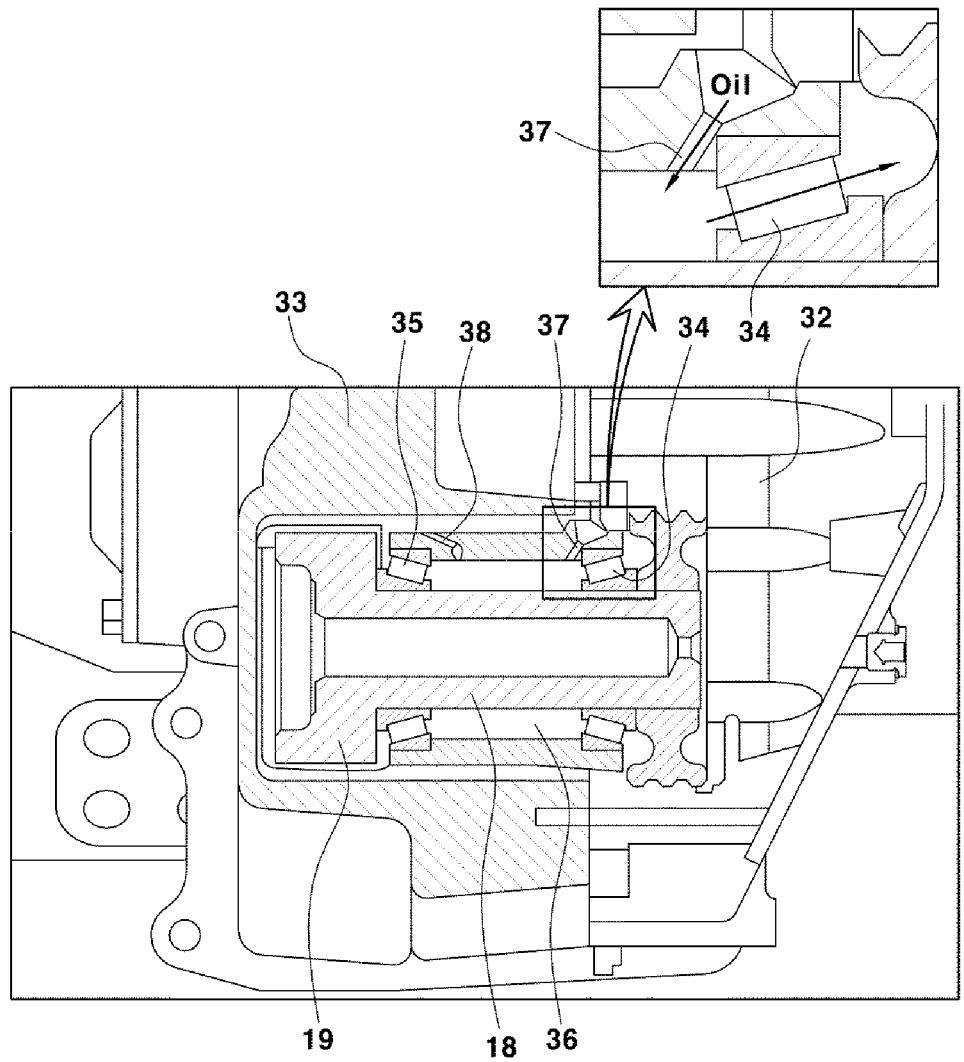
FIG. 5 is a view illustrating an oil supply structure of an output gear in the lubricating apparatus according to the exemplary embodiment of the present invention.

FIG. 4 is a view illustrating a mounted state of a turbo compound system with a lubricating system according to an exemplary embodiment of the present invention. FIG. 5 is a view illustrating an oil supply structure of an output gear in the lubricating apparatus according to the exemplary embodiment of the present invention.

Figure 6:
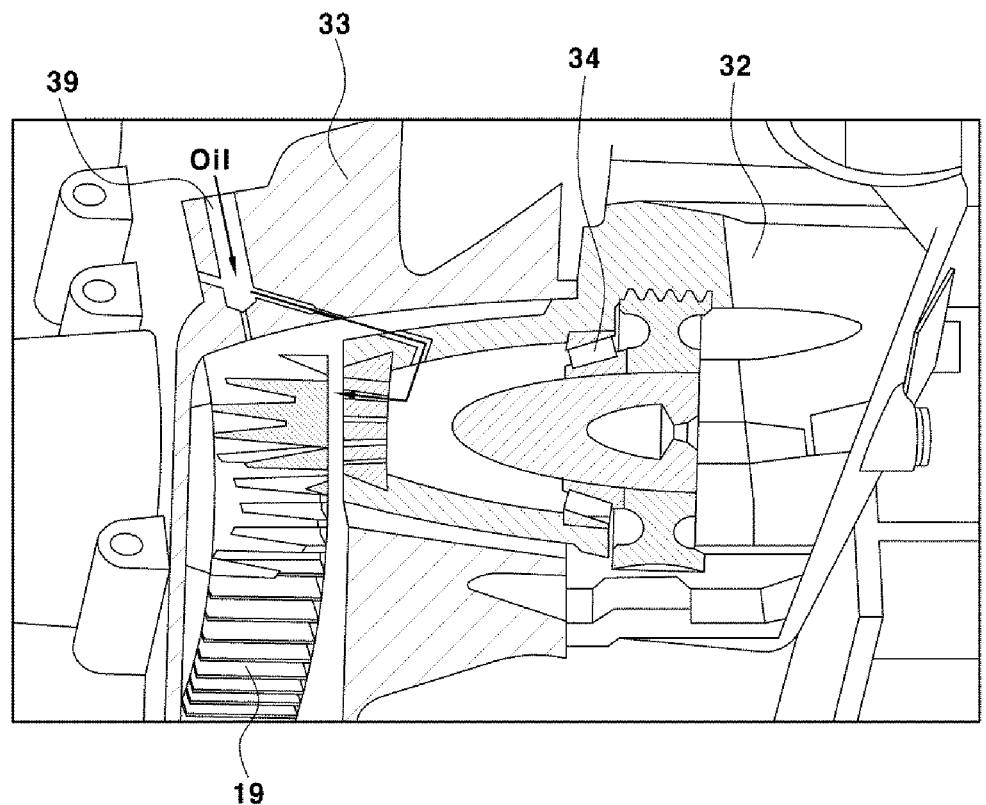
FIG. 6 is a view illustrating an oil supply path for lubricating a bearing of the output gear in the lubricating apparatus according to the exemplary embodiment of the present invention.

Furthermore, FIG. 6 is a view illustrating an oil supply path for lubricating a bearing of the output gear in the lubricating apparatus according to the exemplary embodiment of the present invention.

Each configuration of the turbo compound system will be described with reference to FIG. 1.

First, referring to FIG. 4, the turbine housing 31 in which the blowdown turbine 13 of the turbo compound system is embedded is connected to the gearbox 32. The gearbox 32 and the gear case 33 are assembled integrally.

The reduction gears 16 and 17 and the output gear 19 which reduce turning force of the blowdown turbine 13 to transmit and output the turning force are embedded in the gearbox 32 and the gear case 33.

That is, the first reduction gear 16 and the second reduction gear 17 for reducing turning force of the blowdown turbine 13 are embedded in the gearbox 32. The output gear finally outputting turning force reduced at the turbo compound system is embedded in the gear case 33.

The output gear 19 is engaged with the crankshaft gear 22 to transmit turning force of the turbo compound system to the crankshaft 21 through the crankshaft gear 22.

Herein, the shaft of each gear is rotatably supported by the bearings in the gearbox 32 and the gear case 33. In the case of the reduction gears 16 and 17, lubrication of the bearings of the reduction gears 16 and 17 is performed by oil supplied through the oil supply pipe 41 from the cylinder block 10*a* of the engine 10.

The oil supply pipe 41 is mounted to be connected between the cylinder block 10*a* and an inside space of the gearbox 32 to supply oil for lubrication from the cylinder block 10*a* to the reduction gears 16 and 17 in the gearbox 32 of the turbo compound system.

The shaft 18 of the output gear 19 embedded in the gear case 33 is rotatably supported by the bearings 34 and 35. Referring to FIG. 5, the shaft 18 of the output gear 19 of the turbo compound system is mounted throughout the insides of the gearbox 32 and the gear case 33.

Herein, the shaft 18 of the output gear 19 is rotatably supported by two tapered bearings 34 and 35 at both sides of the shaft 18. The bearings 34 and 35 have an integrated bearing housing 36. The entire bearing including the bearing housing 36 is mounted throughout the insides of the gearbox 32 and the gear case 33.

Herein, two bearings 34 and 35 having the integrated bearing housing 36 are disposed between an outside circumferential surface of a shaft 18 of the output gear 19, and the gearbox 32 and the gear case 33. One part of the bearing housing 36 is disposed between the outside circumferential surface of the shaft 18 of the output gear 19 and the gearbox 32. The other part of the bearing housing 36 is disposed between the outside circumferential surface of the shaft 18 of the output gear 19 and the gear case 33.

Furthermore, the first bearing 34 of the two bearings 34 and 35 is disposed between the outside circumferential surface of the output gear 19 and the gearbox 32. The second bearing 35 is disposed between the outside circumferential surface of the output gear 19 and the gear case 33. The first bearing 34 is closer to the inside space of the gearbox 32 and the reduction gears 16 and 17 than the second bearing 35. Accordingly, lubrication of the first bearing 34 is performed by oil that is scattered and collected after lubrication of the reduction gears 16 and 17 is performed in the gearbox 32, as in the related art.

Namely, a first oil supply hole 37 communicating with the inside space of the gearbox 32 is formed at a portion of the bearing housing 36 at which the first bearing 34 is disposed. After lubrication of the reduction gears 16 and 17 is performed in the inside space of the gearbox 32, oil scattered from the reduction gears 16 and 17 is collected to be supplied to the first bearing 34 through the first oil supply hole 37 of the bearing housing 36.

Referring to FIG. 5, according to change in an engine layout, a length of the shaft 18 of the output gear 19 becomes larger than the configurations of FIG. 2. In the case that the first bearing 34 and the second bearing 35 are lubricated by oil collected after being scattered in the gearbox 32, oil supply to the second bearing 35 is insufficient, particularly.

Namely, as the length of the shaft 18 of the output gear 19 expands according to the position of the output gear 19, a distance between the first bearing 34 and the second bearing 35 is increased. Thus, it is difficult to lubricate the second bearing 35 using oil collected after being scattered in the gearbox 32 of the turbo compound system.

Accordingly, due to extension of the length of the shaft 18 of the output gear 19, the second bearing 35 is disposed further from the inside space of the gearbox 32 and the reduction gears 16 and 17 than the first bearing 34. Thus, a separate oil supply structure or apparatus for supplying oil to the second bearing 35 is provided.

That is, as illustrated in FIG. 4, a sub-supply pipe 42 connected to the oil supply pipe 41 to be diverged from the oil supply pipe 41 is mounted. The sub-supply pipe 42 is diverged from the oil supply pipe 41 to be connected to the gear case 33.

Herein, the sub-supply pipe 42 is connected to a position of the gear case 33 adjacent to the bearing housing 36 at which the second bearing 35 is disposed. A second oil supply hole 38 for supplying oil supplied through the sub-supply pipe 42 to the second bearing 35 is formed to be transpierced at the part of the bearing housing 36 at which the second bearing 35 disposed.

Furthermore, an oil passage hole 39 is formed at the gear case 33. The oil passage hole 39 extends from a part connected to the sub-supply pipe 42 to the second oil supply hole 38. Accordingly, oil supplied from the oil supply pipe 41 to the sub-supply pipe 42 may be supplied to the second oil supply hole 38 in the bearing housing 36 through the oil passage hole 39 in the gear case 33.

In addition, in the exemplary embodiment of the present invention, a supply control valve 43 may be mounted at the sub-supply pipe 42. The supply control valve 43 may include an electronic valve of which the opening or closing operations are controlled by control signals of a controller including a solenoid valve. The supply control valve 43 is a valve which selectively supplies or blocks oil for lubricating the second bearing 35 as needed.

FIG. 5 shows an oil supply path for lubricating the first bearing 34. The reduction gears 16 and 17 in the gearbox 32 are lubricated by oil supplied to the inside space of the gearbox 32 through the oil supply pipe 41. After oil used for lubricating the reduction gears 16 and 17 is scattered, the oil is collected to be supplied to the first oil supply hole 37 of the bearing housing 36 at the inside space of the gearbox 32.

Herein, due to pumping out effect of the first bearing 34 that is a tapered bearing, most oil supplied through the first oil supply hole 37 is supplied to the first bearing 34.

Next, as illustrated in FIG. 6, oil directly supplied from the engine 10 through the oil supply pipe 41 and the sub-supply pipe 42 without passing through the gearbox 32 and the reduction gears 16 and 17 is supplied to the second supply hole 38 of the bearing housing 36 through the oil passage hole 39 in the gear case 33. Oil supplied and sprayed through the second supply hole 38 properly lubricates the second bearing 35 and the output gear 19 of the turbo compound system engaged with the crankshaft gear 22.

As a result, the separate oil supply line for lubricating the second bearing 35 is added to solve lack of bearing oil supply of the output gear 19 regardless of the engine layout. Oil may be stably supplied to the second bearing 35 regardless of the length of the shaft 18 of the output gear 19 according to the engine layout.

Figure 7A:
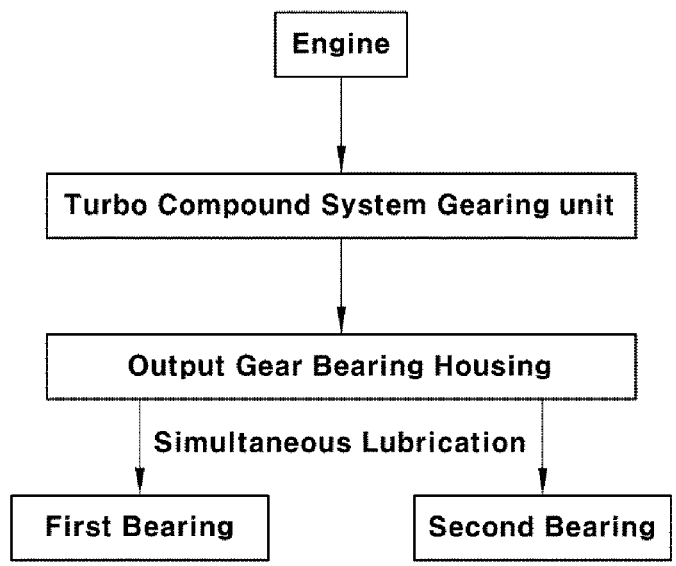
FIGS. 7A and 7B are views schematically comparing a conventional oil supply path and the oil supply path according to an exemplary embodiment of the present invention.
Figure 7B:
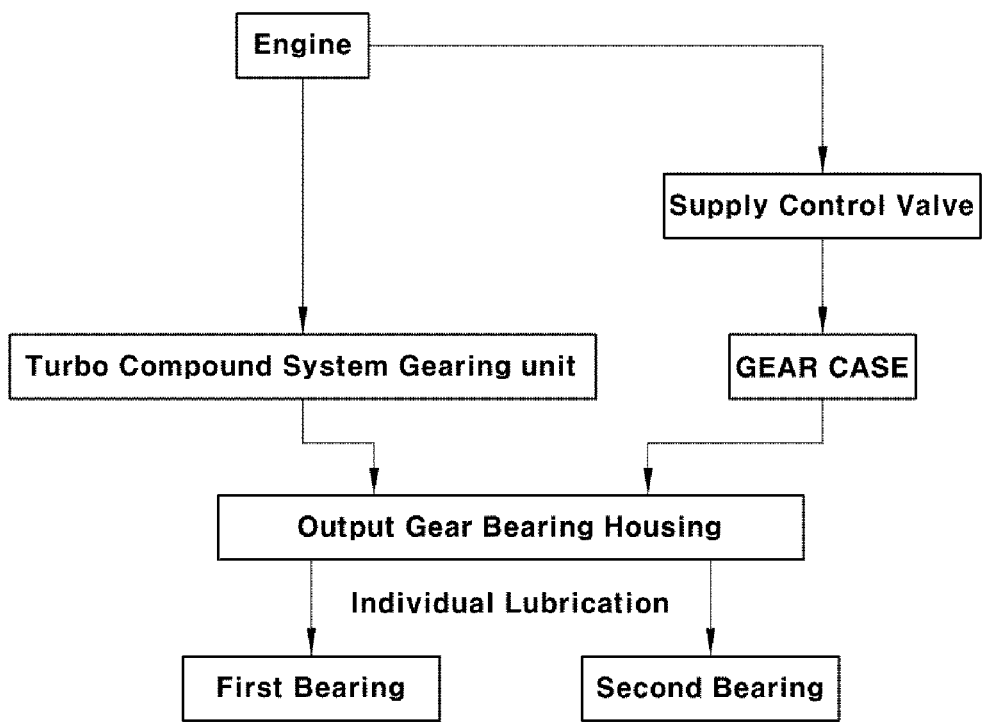

FIG. 7 illustrates a view schematically comparing an oil supply path of the related art and the oil supply path according to an exemplary embodiment of the present invention. According to the related art, oil is supplied from the engine 10 to the gearing device 15 of the turbo compound system. After being supplied to the gearing device 15, oil scattered in the gearbox 32 is supplied to the first bearing 34 and the second bearing 35 through the oil supply hole 37 of the bearing housing 36. The first bearing 34 and the second bearing 35 are simultaneously lubricated by oil distributed to the first bearing 34 and the second bearing 35.

Meanwhile, according to an exemplary embodiment of the present invention, oil is supplied from the engine 10 to the gearing device 15 of the turbo compound system through the oil supply pipe 41. After being supplied to the gearing device 15, oil scattered in the gearbox 32 is supplied through the first oil supply hole 37 of the bearing housing 36.

In addition, after oil is supplied from the engine 10 to the gear case 33 through the sub-supply pipe 42 diverged from the oil supply pipe 41, oil is directly supplied and sprayed through the oil passage hole 39 in the gear case 33 and the second oil supply hole 38 of the bearing housing 36.

Eventually, oil supplied through the first oil supply hole 37 is supplied to the first bearing 34 and oil supplied through the second oil supply hole 38 is supplied to the second bearing 35. Accordingly, the bearings 34 and 35 are lubricated by oil separately supplied to the bearings 34 and 35.

As apparent from the above description, in a lubricating apparatus for a turbo compound system in accordance with the present invention, the oil supply system of the bearing may be improved to solve degradation of lubrication due to lack of oil supply.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lubricating apparatus of a turbo compound system comprising:
    an oil supply pipe connected to a gearbox of a gearing device for transmitting turning force of a blowdown turbine in the turbo compound system to a crankshaft to supply oil into the gearbox;
    a first oil supply opening formed to be transpierced at a bearing housing of a first bearing rotatably supporting a shaft of an output gear for outputting turning force in the turbo compound system to supply oil supplied from the gearbox to the first bearing;
    a sub-supply pipe connected to a gear case in which the output gear is embedded to supply oil to the gear case; and
    a second oil supply opening formed to be transpierced at the bearing housing of a second bearing rotatably supporting the shaft of the output gear to supply oil supplied through the sub-supply pipe to the second bearing.

2. The lubricating apparatus according to claim 1, wherein the oil supply pipe is connected from a cylinder block of an engine to the gearbox in which reduction gears of the gearing device are embedded to supply oil from the engine.

3. The lubricating apparatus according to claim 1, wherein the sub-supply pipe is diverged from the oil supply pipe to supply oil from the oil supply pipe and is connected to the gear case.

4. The lubricating apparatus according to claim 1, wherein the sub-supply pipe supplies oil from the engine to the gear case.

5. The lubricating apparatus according to claim 1, wherein the sub-supply pipe is mounted with a supply control valve for selectively controlling supply or block of oil.

6. The lubricating apparatus according to claim 1, wherein an oil passage opening is formed to be transpierced at the gear case, to supply oil supplied through the sub-supply pipe to the second oil supply opening through the oil passage opening.

* * * * *